Figure 1:
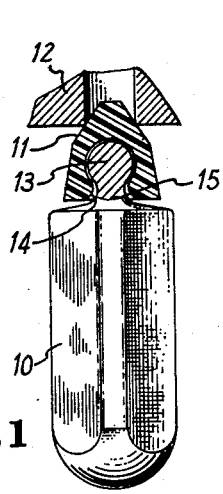

Nov. 3, 1964  R. T. GIFFORD  3,155,367
VALVE PLUNGER
Filed Jan. 11, 1962

INVENTOR.
ROBERT T. GIFFORD,
BY
*Jungblut, Melville, Strasser + Foster*
ATTORNEYS.

United States Patent Office 3,155,367
Patented Nov. 3, 1964

3,155,367
VALVE PLUNGER
Robert T. Gifford, Yellow Springs, Ohio, assignor to Vernay Laboratories, Inc., Yellow Springs, Ohio, a corporation of Ohio
Filed Jan. 11, 1962, Ser. No. 165,498
8 Claims. (Cl. 251—86)

This invention resides in an improved valve plunger, and in particular a valve plunger comprised of a relatively rigid body and a separate resilient tip.

An important object of this invention is to provide improved designs for the plunger component of a valve, the valve being of the type which incorporates a plunger to engage the periphery of an orifice so as to seal the orifice.

It will be understood that the type of valve assembly in which the novel plunger of this invention is employed is found in carburetor inlet valves, check valves, solenoid valves and others, working in both liquid and gas medias. As has already been indicated, however, the present invention resides in the construction of the valve plunger and, therefore, in the description which follows only the plunger, along with its relationship to the orifice with which it cooperates, will be described in detail.

Another important object of this invention is to provide a plunger which may be made in two pieces, the relatively rigid body and separate resilient tip, which pieces may be rapidly and readily assembled, and wherein the tip is secure from separation from the body after these have been assembled.

A further object of the invention is to provide a valve plunger the body of which may be made from a thermoplastic material and the tip of which may be made from a resilient rubber, or rubber-like material, an arrangement ordinarily considered impossible, if the resilient tip were to be molded directly to the body (as is now done), due to the general inability of most thermoplastics to remain dimensionally stable under the conditions of high pressure and high temperature which are normally employed in these rubber molding processes.

A very important object of the invention is to provide a valve plunger having a movable tip, whereby the tip will seal an orifice, or seat, under conditions of eccentricity or mis-alignment between the axis of the plunger and that of the orifice, thus obtaining, even under these conditions of mis-alignment, an adequate seal without the necessity of excessive pressure of the plunger on the seat.

Another object of the invention is to provide a valve plunger in which the tip may be snapped onto the body, and which tip will be retained on the plunger body due to interlocking engagement between these members.

Figure 2:
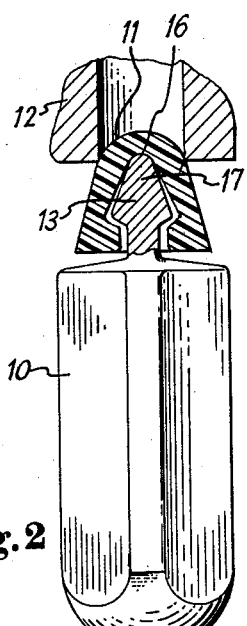
Figure 3:
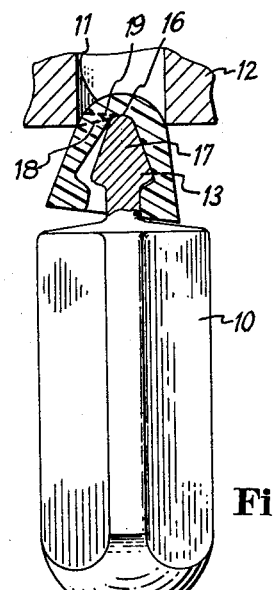
Figure 4:
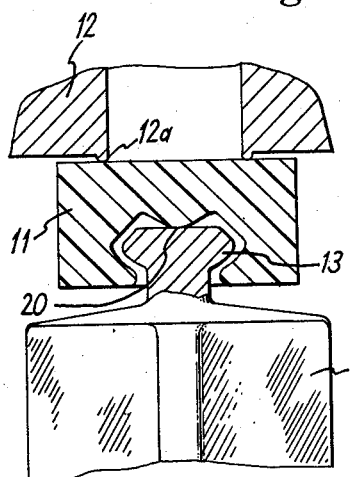
Figure 6:
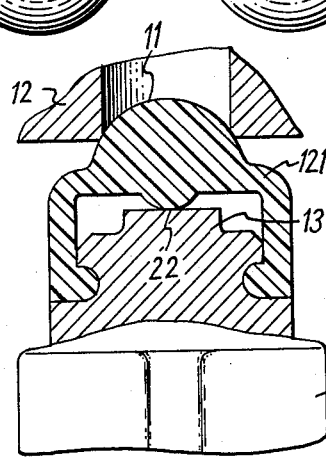
Figure 5:
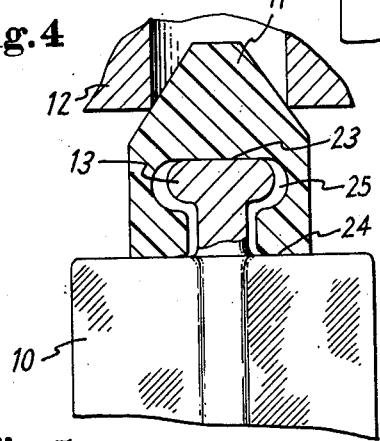
Figure 7:
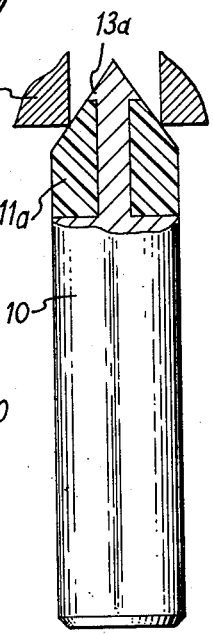

These and other objects of the invention will become apparent to those skilled in the art from a reading of the description to follow, keeping the above objects in mind and with reference to the accompanying drawings, in which drawings like numerals are employed to designate like parts throughout, and in which:

FIGURE 1 is a front elevation, partly in section, of one modification of a two piece valve plunger embodying this invention and showing the tip seated on the valve seat, FIGURE 2 is a front elevation, partly in section, of another modification of the invention, FIGURE 3 is a front elevation partly in section, showing another position of the parts of the plunger of FIGURE 2, FIGURE 4 is a front elevation, with parts broken away and parts shown in section, of another form of this invention, FIGURE 5 is a front elevation, with parts broken away and parts shown in section, of another modification of the invention, FIGURE 6 is a front elevation, with parts in section and parts broken away, showing yet another form of the invention, and FIGURE 7 is a front elevation, partly in section, showing another arrangement embodying the invention.

In all of the forms of this invention the plunger assembly is manufactured with two separate components, namely, a tip and plunger body, which components are assembled to produce a single plunger unit. In most of the arrangements the tip, in assembled condition, is movable on the end of the plunger body. In all of the arrangements the tips are securely fastened to the plunger bodies.

Referring now to FIGURE 1 there is shown a valve plunger consisting of a relatively rigid valve body 10 and a resilient tip 11. The tip is shown engaged on a valve seat 12. The plunger tip 11 is independently molded, that is, it is not molded directly on the plunger body, from a resilient, or rubber-like material; thereafter the tip is assembled on the rigid or relatively rigid plunger body 10. The tip is capable of rapid assembly, and positive retention, to the plunger body 10 due to the elastic quality of the tip material, and to the construction of the body and tip, which permits the tip to be forced over the end 13 of the body. The tip 11 will be retained on the plunger body 10 due to the locking relationship, in the resilient tip's relaxed and no stress state, between the annular lip 14 of the tip 11 and the recessed annular cavity 15 of the plunger body 10.

In the arrangements of FIGURES 1–6 some movement of the tip 11 on the body 10, after the two are assembled, is provided. This feature of tip movement on the body may be provided in several different, but related ways. Most commonly this is accomplished by providing a calculated clearance between the retaining lip 14 of the tip 11 and the cavity or neck portion 15 of the plunger body 10, permitting the tip to move. This clearance can be minimal; for instance, a clearance of .001 inch could correct, to some degree, misalignment between plunger and seat. This movement may be of different types. The arrangement of FIGURE 1 permits a limited amount of axial movement of the tip 11 with respect to the body 10. In other arrangements, as will be described shortly, lateral movement, movement perpendicular to the axis of the body 10, is provided. Within limited ranges the tip motion or position is independent of the plunger body motion or position, as is readily apparent.

This feature of tip movement, by correctly designing the pivot point and/or lateral movement feature, together with the actual configuration of the tip itself, that is, flat, conical, or spherical, depending on the specific valve application, allows the tip to seal an orifice, or seat, under conditions of eccentricity or misalignment between the axis of the plunger and that of the orifice. In the absence of this feature of the invention, such misalignment heretofore would not have permitted an adequate seal, or it would have required excessive pressure on the plunger to make it seat.

Referring now to FIGURES 2 and 3 there is disclosed a valve plunger again consisting of the body 10 and tip 11, which tip seats on the seat 12. In this plunger assembly, however, the tip 11 is spherical. The pivot point 16 for the tip is extended close to the face of the seat and above what would be the center point 17 of the tip sphere. By providing the pivot 16 as indicated, such arrangement facilitates seal of an originally mis-aligned tip by increasing the effective radius (indicated by the arrow 18 in FIGURE 3) from the original radius (indicated by the numeral 19 in FIGURE 3) as the tip rolls from an original misaligned contact at the orifice edge. The spherical tip as illustrated in FIGURES 2 and 3 gives a sealing advantage over a conical tip by presenting a true circular tip cross-section to the orifice even in misaligned position;

a conical tip, if misaligned with the orifice, would present an elliptical sealing cross-section to the circular orifice.

The arrangement of FIGURE 4 shows a tip 11 sealing against an orifice having a raised sealing lip 12a. The tip 11 may move with respect to the body 10 by rocking about the portion 20 which engages the plunger end 13. In this case the upper part of the tip 11 is flat so that it will engage the lip 12a as indicated.

In the arrangement of FIGURE 6 the snap-on tip 11 is provided with a diaphragm section 21 which permits the tip to move about the pivot portion 22 which engages the end 13 of the plunger 10. It will be understood that this diaphragm section 21 is relatively thin as illustrated.

In FIGURE 5 there is shown an arrangement of a snap-on tip 11 designed primarily for lateral movement of the tip with respect to the plunger body 10 as distinguished from the axial or pivoted movements discussed in the other arrangements. This lateral movement, movement perpendicular to the axis of the plunger 10, is accomplished by eliminating a pivot point for the tip, providing bearing flats 23 and 24, and allowing the clearance indicated at 25.

The modification of FIGURE 7, while retaining many of the features and advantages of this invention, does not include a tip which is free to move after it is assembled on the plunger body. The tip 11a is retained on the body 10 by means of the protruding apex 13a on this body. This tip 11a may be separately manufactured, however, and readily snapped into place on the plunger body 10 in accordance with the basic teachings of this invention.

It is believed that the invention has been thoroughly described in the foregoing passages. It is to be understood, however, that although the invention has been described with reference to particular structures and arrangements, these are exemplary only, and it is not intended that the invention be limited to these particular structures and arrangements except insofar as they are specifically set forth in the subjoined claims. It is to be further understood that additional modifications may be made in this invention by those skilled in the art without departing from the scope and spirit of the invention.

Having thus described the invention, what is claimed as new and what is desired to be protected by United States Letters Patent is:

1. A valve plunger comprised of a relatively rigid body, a separate, relatively resilient tip, means for maintaining said tip in snap-on engagement with said body, and means by which said tip is movable on said body after being engaged thereto, said last mentioned means providing for axial movement of said tip with respect to said body.

2. A valve plunger comprised of a relatively rigid body, a separate, relatively resilient tip, means for maintaining said tip in snap-on engagement with said body, and means by which said tip is movable on said body after being engaged thereto, said last mentioned means providing for lateral movement of said tip with respect to said body.

3. The plunger of claim 1 in which said last mentioned means comprises a spherical member on said body, said body having a neck portion of reduced diameter adjacent said spherical member, the means for maintaining said tip in snap-on engagement with said body including an annular lip on said tip extending into the cavity formed by said neck portion, and said tip having a spherical hollow to receive said spherical member, said spherical hollow being larger than said spherical member, whereby said tip pivots axially on said body.

4. The plunger of claim 1 in which said last mentioned means comprises a conical member on said body, said body having a neck portion of reduced diameter adjacent said conical member, the means for maintaining said tip in snap-on engagement with said body including an annular lip on said tip extending into the cavity formed by said neck portion, and said tip having a substantially conical hollow to receive said conical member, said conical hollow being larger than said conical member, whereby said tip pivots axially on said body.

5. The plunger of claim 4 in which the outermost valve-seat bearing surface of said tip is spherical, the point of contact between said conical member and the bottom of the conical hollow of said tip being between said spherical bearing surface and the center of the sphere defining said spherical bearing surface.

6. A valve plunger comprised of a relatively rigid body, a separate, relatively resilient tip, means for maintaining said tip in snap-on engagement with said body, and means by which said tip is movable on said body after being engaged thereto, said last mentioned means comprising a bearing member on said body, said body having a neck portion of reduced diameter adjacent said bearing member, the means for maintaining said tip in snap-on engagement with said body including an annular lip on said tip extending into the cavity formed by said neck portion, and said tip having a hollow to receive said bearing member, said hollow being larger than said bearing member, whereby said tip moves on said body.

7. The plunger of claim 6 in which said tip has a projection extending from the bottom of said hollow and engaging the end of said bearing member, whereby said tip is movable axially on said body.

8. The plunger of claim 6 in which said body has a flat shoulder adjacent said neck portion and the outer end of said bearing member being flat, the bottom of said hollow which engages said bearing member being flat, and the said annular lip engaging said shoulder, whereby said tip is movable laterally on said body.

References Cited in the file of this patent

UNITED STATES PATENTS

| | | |
|---|---|---|
| 2,077,766 | Mead | Apr. 20, 1937 |
| 2,285,343 | Marchand | June 2, 1942 |
| 2,904,068 | St. Clair | Sept. 15, 1959 |
| 2,920,861 | Hartmann | Jan. 12, 1960 |

FOREIGN PATENTS

| | | |
|---|---|---|
| 478,627 | Canada | Nov. 20, 1951 |
| 487,096 | France | Mar. 12, 1918 |
| 971,446 | France | July 19, 1950 |
| 902,477 | Germany | Jan. 21, 1954 |
| 11,915 | Great Britain | Aug. 17, 1888 |